(12) United States Patent
Bossen

(10) Patent No.: US 7,627,187 B2
(45) Date of Patent: Dec. 1, 2009

(54) LOW COMPLEXITY AND UNIFIED TRANSFORMS FOR VIDEO CODING

(75) Inventor: Frank Jan Bossen, San Jose, CA (US)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/032,433

(22) Filed: Feb. 15, 2008

(65) Prior Publication Data

US 2008/0137757 A1 Jun. 12, 2008

Related U.S. Application Data

(62) Division of application No. 10/670,698, filed on Sep. 24, 2003.

(51) Int. Cl.
*G06K 9/36* (2006.01)
(52) U.S. Cl. .................. 382/250; 382/232; 382/233; 382/248; 375/240.2
(58) Field of Classification Search .......... 382/232, 382/233, 248, 250; 375/240.2
See application file for complete search history.

(56) References Cited

U.S. PATENT DOCUMENTS

| 5,129,015 | A | | 7/1992 | Allen et al. | |
|---|---|---|---|---|---|
| 5,224,062 | A | * | 6/1993 | McMillan et al. | 708/402 |
| 5,519,503 | A | * | 5/1996 | Ohki | 375/240.2 |
| 6,574,368 | B1 | * | 6/2003 | Boon et al. | 382/232 |
| 6,792,149 | B1 | * | 9/2004 | Florencio | 382/233 |
| 6,882,685 | B2 | * | 4/2005 | Malvar | 375/240.03 |
| 7,082,450 | B2 | | 7/2006 | Hallapuro et al. | |
| 7,242,713 | B2 | | 7/2007 | Srinivasan et al. | |
| 7,323,421 | B2 | | 1/2008 | Stinson et al. | |
| 2008/0137757 | A1 | | 6/2008 | Bossen | |
| 2008/0137758 | A1 | | 6/2008 | Bossen | |

OTHER PUBLICATIONS

Wiegand, "Joint Committee Draft (CD)", May 6-10, 2002, Joint Video Team of ISO/IEC MPEG and ITU-T VCEG, 3rd Meeting, pp. 1-132.*
T. Wiegand, Joint Final Committee Draft (JFCD) of Joint Video Specification (ITU-T Rec. H.264 | ISO/IEC 14496-10 AVC), Joint Video Team(JVT) of ISO/IEC MPEG and ITU-VCEG, 4$^{th}$ Meeting: Klagenfurt, Austria, Jul. 22-26, 2002, 207 pages. JVT-D157.
Malwar, Henrique et al., "Low-Complexity Transform and Quantization with 16-Bit Arithmetic for H. 26L", Proceedings 2002 International Conference on Image Processing, ICIP 2002, Rochester, New York, New York, Sep. 22-25, 2002, IEEE, US, vol. 2 of 3, Sep. 22, 2002, pp. 489-492.

(Continued)

*Primary Examiner*—Vikkram Bali
*Assistant Examiner*—Daniel Zeilberger
(74) *Attorney, Agent, or Firm*—Brinks Hofer Gilson & Lione

(57) ABSTRACT

A method and apparatus is disclosed herein for decoding data (e.g., video data) using transforms. In one embodiment, the decoding process comprises scaling a block of coefficients using a scaling factor determined for each coefficient by computing an index for said each coefficient and indexing a look-up table (LUT) using the index. The index is based on a quantization parameter, a size of the block of coefficients, and a position of said each coefficient within the block. The method also comprises applying a transform to the block of scaled coefficients.

14 Claims, 9 Drawing Sheets

| 1 | 1.25 | 1 | 0.5 |
|---|---|---|---|
| 1 | 0.5 | -1 | -1.25 |
| 1 | -0.5 | -1 | 1.25 |
| 1 | -1.25 | 1 | -0.5 |

OTHER PUBLICATIONS

Topiwala, Pankaj, "Status of the Emerging ITU-T/H.264/ISO/MPEG-4, Part 10 Video Coding Standard", Proceeding of the SPIE, SPIE, Bellingham, VA, US, vol. 4790, Jul. 8, 2002, pp. 261-277.

Topiwala, Pankaj, "Overview and Performance Evaluation of the ITU-T Draft H.26L Video Coding Standard ", Proceeding of the SPIE, SPIE, Bellingham, VA, US, vol. 4472, Jul. 31, 2001, pp. 290-306.

PCT Search Report mailed Jan. 21, 2004, International Application No. PCT/US03/30476, 4 pages.

Wiegand, "Joint Committee Draft (CD)", May 6-10, 2002, Joint Video Team of ISO/IEC MPEG and ITU-T VCEG, $3^{rd}$ Meeting, pp. 1-132.

Office Action issued in related U.S. Appl. No. 10/670,698, dated Apr. 6, 2009, 58 pages.

Office Action issued in related U.S. Appl. No. 12/032,439, dated Mar. 31, 2009, 20 pages.

\* cited by examiner

|    |    |    |
|----|----|----|
| 10 | 16 | 13 |
| 11 | 18 | 14 |
| 13 | 20 | 16 |
| 14 | 23 | 18 |
| 16 | 25 | 20 |
| 18 | 29 | 23 |

FIGURE 1A
(PRIOR ART)

|    |    |
|----|----|
| 9  | 11 |
| 10 | 12 |
| 11 | 14 |
| 12 | 16 |
| 14 | 17 |
| 15 | 20 |

FIGURE 1B
(PRIOR ART)

|    |
|----|
| 15 |
| 17 |
| 19 |
| 22 |
| 24 |
| 27 |

FIGURE 1C
(PRIOR ART)

| 1 | 1    | 1  | 1/2  |
|---|------|----|------|
| 1 | 1/2  | -1 | -1   |
| 1 | -1/2 | -1 | 1    |
| 1 | -1   | 1  | -1/2 |

FIGURE 2A
(PRIOR ART)

| 13 | 19  | 17  | 9   | 13  | 15  | 7   | 3   |
|----|-----|-----|-----|-----|-----|-----|-----|
| 13 | 15  | 7   | 3   | -13 | -19 | -17 | -9  |
| 13 | 9   | -7  | -19 | -13 | -3  | 17  | 15  |
| 13 | 3   | -17 | -15 | 13  | 9   | -7  | -19 |
| 13 | -3  | -17 | 15  | 13  | -9  | -7  | 19  |
| 13 | -9  | -7  | 19  | -13 | 3   | 17  | -15 |
| 13 | -15 | 7   | -3  | -13 | 19  | -17 | 9   |
| 13 | -19 | 17  | -9  | 13  | -15 | 7   | -3  |

FIGURE 2B
(PRIOR ART)

| 1 | 12/8 | 1 | 10/8 | 1 | 6/8 | 1/2 | 3/8 |
| 1 | 10/8 | 1/2 | -3/8 | -1 | -12/8 | -1 | -6/8 |
| 1 | 6/8 | -1/2 | -12/8 | -1 | 3/8 | 1 | 10/8 |
| 1 | 3/8 | -1 | -6/8 | 1 | 10/8 | -1/2 | -12/8 |
| 1 | -3/8 | -1 | 6/8 | 1 | -10/8 | -1/2 | 12/8 |
| 1 | -6/8 | -1/2 | 12/8 | -1 | -3/8 | 1 | -10/8 |
| 1 | -10/8 | 1/2 | 3/8 | -1 | 12/8 | -1 | 6/8 |
| 1 | -12/8 | 1 | -10/8 | 1 | -6/8 | 1/2 | -3/8 |

```
a[0] = in[0] + in[4];
a[4] = in[0] - in[4];
a[2] = (in[2]>>1) - in[6];
a[6] = in[2] + (in[6]>>1);

b[0] = a[0] + a[6];
b[2] = a[4] + a[2];
b[4] = a[4] - a[2];
b[6] = a[0] - a[6];

a[1] = -in[3] + in[5] - in[7] - (in[7]>>1);
a[3] = in[1] + in[7] - in[3] - (in[3]>>1);
a[5] = -in[1] + in[7] + in[5] + (in[5]>>1);
a[7] = in[3] + in[5] + in[1] + (in[1]>>1);

b[1] = a[1] + (a[7]>>2);
b[7] = -(a[1]>>2) + a[7];
b[3] = a[3] + (a[5]>>2);
b[5] = (a[3]>>2) - a[5];
out[0] = b[0] + b[7];
out[1] = b[2] + b[5];
out[2] = b[4] + b[3];
out[3] = b[6] + b[1];
out[4] = b[6] - b[1];
out[5] = b[4] - b[3];
out[6] = b[2] - b[5];
out[7] = b[0] - b[7];
```

| 1 | 1.25 | 1 | 0.5 |
|---|---|---|---|
| 1 | 0.5 | -1 | -1.25 |
| 1 | -0.5 | -1 | 1.25 |
| 1 | -1.25 | 1 | -0.5 |

LOW COMPLEXITY AND UNIFIED TRANSFORMS FOR VIDEO CODING

PRIORITY

This is a divisional of application Ser. No. 10/670,698, filed on Sep. 24, 2003, entitled "Low Complexity and Unified Transforms For Video Coding," and assigned to the corporate assignee of the present invention and incorporated herein by reference.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE INVENTION

This application relates to video coding, and more particularly, to low complexity and unified transforms for video coding.

BACKGROUND OF THE INVENTION

Digital television and DVD-video have been made possible by the standardization of video compression technology. A recent standard, ITU-T H.264 (hereinafter H.264), is enabling a new generation of applications. The H.264 standard does not explicitly define a codec. Rather the standard defines the syntax of an encoded video bitstream with a method of decoding the bitstream.

As part of the process to create an encoded video bitstream that can be decoded according to the method set forth in the H.264 standard, an encoder performs a transform and quantization. More specifically, the encoder divides data into macroblocks, and each macroblock is transformed, quantized and coded. Previous standards used the 8×8 Discrete Cosine Transform (DCT) as the basic transform that operates on floating-point coefficients. In contrast, a draft version of H.264 (T. Wiegand, ed., "Editor's Proposed Draft Text Modifications for Joint Video Specification (ITU-T Rec. H.264|ISO/IEC 14496-10 AVC), Draft 7, section 12.4.3) uses a DCT-like 4×4 integer transform but can apply the transform on a number of different block sizes (4×4, 4×8, 8×4, and 8×8). Coefficients from the transform stage undergo quantization. After quantization, quantized coefficients are entropy coded.

The decoding method of H.264 is the reverse of the encoding process described above. More specifically, encoded data undergoes entropy decoding, followed by the application of inverse quantization and an inverse transform. More specifically as set forth in an early draft of the H.264 standard (reference to JFCD), during decoder, after arranging quantized coefficients into a 2-dimensional array (of size either 4×4, 4×8, 8×4 or 8×8), inverse quantization is applied. After performing inverse quantization, inverse transforms are applied to the coefficients, typically first in the horizontal direction and then in the vertical direction. Finally the resulting values are scaled. In the case of 4×8, 8×4 or 8×8 block sizes, an additional scaling operation is performed between application of the horizontal and the vertical inverse transforms.

Irrespective of the block size (e.g., 4×4 block, 4×8 or 8×4 block, and 8×8 block) the same quantization parameter (QP) is used to indicate how fine or coarse the quantization was performed in the encoder. QP is usually a positive integer value between 0 and 51. In one prior art implementation, the QP for 4×8, 8×4 and 8×8 blocks is restricted to values 12 or larger, for example, as described in T. Wiegand, Ed., "Joint Final Committee Draft (JFCD) of Joint Video Specification (ITU-T Rec. H.264|ISO/IEC 14496-10 AVC) (hereinafter "Wiegand"), hereby incorporated by reference herein. As discussed therein, the inverse quantization was applied using an array, referred to as array V, that was different for each of three different blocks size types, namely 4×4 block, 4×8 or 8×4 block, and 8×8 block.

For a 4×4 block, array V is shown at FIG. 1A. For each quantized coefficient $c\_ij$, the coefficient $w\_ij$ is obtained as a result of applying the array V to a block of quantized coefficients, in standard C-language notation, as:

$$w\_ij = (c\_ij * R\_ij(QP\%6)) << (QP/6)$$

where $R\_ij(m)$ is equal to $V\_m0$ if ij is in $\{00, 02, 20, 22\}$, equal to $V\_m1$ if ij is in $\{11, 13, 31, 33\}$ and equal to $V\_m2$ otherwise, and where $V\_mn$ is the entry in the m-th row and n-column of the array V.

For an 8×4 or a 4×8 block, the array V is shown in FIG. 1B. For each quantized coefficient $c\_ij$, the coefficient $w\_ij$ is obtained as a result of applying the array V to a block of quantized coefficients as:

$$w\_ij = (c\_ij * R\_ij(QP\%6)) << ((QP/6)-2)$$

where $R\_ij(m)$ is equal to $V\_m0$ if i (for 4×8 blocks) or j (for 8×4 blocks) is in $\{0, 2\}$, and is equal to $V\_m1$ otherwise.

For an 8×8 block, the array V is shown in FIG. 1C. For each quantized coefficient $c\_ij$, the coefficient $w\_ij$ is obtained as a result of applying the array V to a block of quantized coefficients as:

$$w\_ij = (c\_ij * R\_ij(QP\%6)) << ((QP/6)-2)$$

where $R\_ij(m)$ is equal to $V\_m$.

After the inverse quantization is performed, the inverse transformation is performed on the coefficients. As part of one implementation of the H.264 draft standard, applying an inverse transformation to the coefficients includes applying a horizontal transform, performing intermediate scaling, applying a vertical transform, and performing final scaling. Typically, the inverse transforms that are used are separable transforms, and thus typically two 1-dimensional transforms of sizes 4 and 8 respectively have been used.

Basis vectors define the inverse transformation. The basis vectors of one prior art transform of size 4 are defined by the matrix M4, shown in FIG. 2A, while the basis vectors of one prior art transform of size 8 may be defined by the matrix M8 as shown in FIG. 2B.

A horizontal transform in one prior art implementation is applied by performing a matrix multiplication between an array W of coefficients and the transpose of the corresponding transform matrix that includes the basis vectors (i.e. the transform matrix M4 for 4×4 and 4×8 blocks, and the transform matrix M8 for 8×4 and 8×8 blocks). The array Z' containing the result of the horizontal transform is determined as:

$$Z' = W * \text{transpose}(M4), \text{ for } 4 \times 8 \text{ and } 4 \times 4 \text{ blocks, and}$$

$$Z' = W * \text{transpose}(M8), \text{ for } 8 \times 8 \text{ and } 8 \times 4 \text{ blocks}$$

where "*" represents a matrix multiplication.

Intermediate scaling is then carried out by scaling the matrix Z' resulting from the horizontal transform according to:

$$Z\_ij = \text{sign}(Z'\_ij) * ((\text{abs}(Z'\_ij) + (1 << (B-1))) >> B),$$

where $Z'\_ij$ is a coefficient of the array Z', B is 0 for 4×4 blocks, 2 for 4×8 and 8×4 blocks, and 7 for 8×8 blocks.

Next, the vertical transform is applied. Given the array Z, the vertical inverse transform is applied by performing a matrix multiplication between the array Z and the corresponding matrix that includes the basis vectors (i.e. M4 for 8×4 and 4×4 blocks, and M8 for 8×8 and 4×8 blocks). The array X' containing the result of the vertical transform is determined as:

$X'=M4*Z$, for 8×4 and 4×4 blocks, and $X'=M8*Z$, for 8×8 and 4×8 blocks.

After the vertical transform is applied, the final scaling is accomplished by scaling the results of the vertical transform according to:

$X\_ij=(X'\_ij+32)>>6$.

The matrix multiplications using M4 or transpose(M4) are typically implemented as follows. Given an input vector w[0..3], the output vector x[0..3] is obtained by:

$z[0]=w[0]+w[2]$ $z[0]=w[0]-w[2]$ $z[2]=(w[1]>>1)-w[3]$ $z[3]=w[1]+(w[3]>>1)$ $x[0]=z[0]+z[3]$ $x[1]=z[1]+z[2]$ $x[2]=z[1]-z[2]$ $x[3]=z[1]-z[3]$

The above procedure is applied four times to complete a matrix multiplication, once for each row or column of the input array.

Performing the inverse quantization in this fashion restricts a value for the quantization parameter QP to 0-51 for 4×4 blocks of information, and to a value of 12-51 for 4×8, 8×4 and 8×8 blocks of information, thereby limiting the highest quality achievable with transforms other than 4×4.

Furthermore, performing the inverse transformation as described above, requires multiplication operations during the inverse horizontal and vertical transforms, and intermediate scaling, at least for operations on 8×4, 4×8 and 8×8 blocks of information. Such multiplications consume significant processing operations, and the basis vectors of the transform may therefore require modifications enabling fast implementations as in the 4×4 case.

Moreover, to perform the scaling described above, a different table is used based on which inverse transform is being performed. That is, since there are multiple transforms based on the different block sizes, there are a number of tables that must be used when performing the scaling. Requiring the use of multiple tables may not be the most efficient implementation.

Additionally, inverse transformation often requires registers of more than 16 bits in size, consuming additional processor resources by limiting the number of operations that can be executed in parallel on a SIMD architecture (SIMD=Single Instruction Multiple Data, e.g. MMX on Intel processors). One or more of the above disadvantages may exist in encoders as well.

SUMMARY OF THE INVENTION

A method and apparatus is disclosed herein for decoding data (e.g., video data) using transforms. In one embodiment, the decoding process comprises scaling a block of coefficients using a scaling factor determined for each coefficient by computing an index for said each coefficient and indexing a look-up table (LUT) using the index. The index is based on a quantization parameter, a size of the block of coefficients, and a position of said each coefficient within the block. The method also comprises applying a transform to the block of scaled coefficients.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1A is a table of a prior art array V utilized for inverse quantization of a 4×4 block;

FIG. 1B is a table of a prior art array V for inverse quantization of an 8×4 or a 4×8 block;

FIG. 1C is a table of a prior art array V for inverse quantization of an 8×8 block;

FIG. 2A is a table illustrating a basis vector of size 4 defining a matrix M4;

FIG. 2B is a table illustrating a basis vector of the transform of size 8 defining a matrix M8;

FIG. 9 is a table illustrating a basis vector that may be utilized in the design of one embodiment of a single transform;

FIG. 10 illustrates one embodiment of an algorithm that may be utilized in determining a single inverse transform;

DETAILED DESCRIPTION OF THE PRESENT INVENTION

Figures 3, 4:
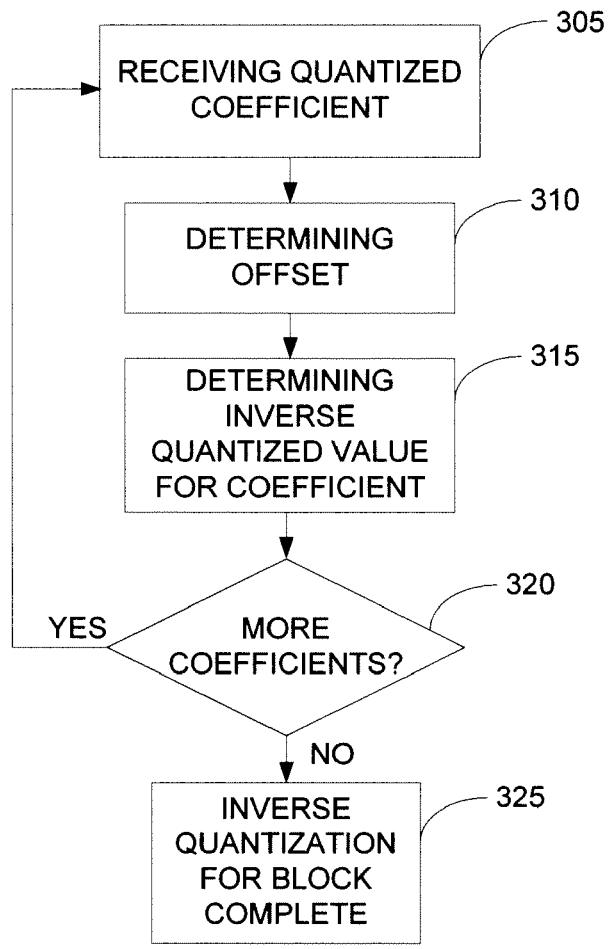
FIG. 3 is a flow diagram of one embodiment of a process for performing an inverse quantization.
FIG. 4 illustrates a table of a vector basis for one embodiment of an inverse transform of size 8.

A method and apparatus for coding and decoding data (e.g., video data) are described. The coding and decoding of data is, in part, through the use of transforms. In one embodiment, the transforms have low complexity and are unified, as will be discussed in greater detail below.

In one embodiment, a method comprises scaling a block of coefficients with a scaling factor. The scaling factor is determined by computing an index based on a quantization parameter, a size of the block, and a position of a coefficient within the block. In one embodiment, the index is the sum of the quantization parameter and a value determined by the size of the block and the position of the coefficient in the block. The value determined by the size of the block and the position of the coefficient in the block maybe determined by the vertical size of the block and the vertical position of the coefficient within the block and a value determined by the horizontal size of the block and the horizontal position of the coefficient within the block. Note that in one embodiment the size of the block may be either 4×4, 4×8, 8×4, or 8×8.

The method of processing data further comprises indexing a single look-up table (LUT) using the index. After indexing the LUT with the index and multiplying to complete the scaling of a block of coefficients, a transform is applied to the block of scaled coefficients. In one embodiment, the transform is computed using a sequence of addition, subtraction and shift operations, such that no matrix multiplication operations need to be performed. Note that the same LUT may be used irrespective of the transform that is applied to the block of scaled coefficients.

More specifically, in one embodiment, a block of information (e.g., a video signal) is processed by receiving a block of coefficient values (e.g., quantized coefficient values), determining an offset value corresponding to a coefficient of the block of quantized coefficient values, and determining an inverse quantization coefficient value in response to the determined offset value. The block of quantized coefficient values may include at least one 4×4, 4×8, 8×4, and 8×8 block of quantized coefficient values.

In one embodiment, the offset value is determined in response to the block of received values and a 1-dimensional array of values. A reconstructed coefficient matrix may be generated in response to determining inverse quantization coefficient values.

In another embodiment, data is processed by coding a block of information which includes receiving a block of coefficient values, and performing an inverse transform on the received block of coefficient values using a basis vector that approximates a discrete cosine transform (DCT). In one embodiment, the block of coefficient values includes at least one 4×4, 4×8, 8×4, and 8×8 block of quantized coefficient values. Further, the block of coefficient values may include inverse quantized video data.

With respect to the inverse transform, in one embodiment, the basis vectors are substantially orthogonal to each other, and may include elements having fractional values. The basis vector may be of size 8×8.

In one embodiment, the inverse transform may be performed using a horizontal inverse transform and a vertical inverse transform. In one embodiment, the horizontal inverse transform is performed on coefficients that have been inverse quantized by applying an inverse quantization matrix to quantized versions of the coefficients. The basis vectors of the transform approximate a DCT. Alternatively, the basis vectors are substantially orthogonal. The horizontal inverse transform may be performed on a vector of inverse quantized coefficients using a sequence of addition, subtraction and shifting operations.

The vertical inverse transform is performed after the horizontal inverse transform, although the order of the vertical inverse transform and horizontal inverse transforms may be reversed. In one embodiment, the vertical inverse transform is performed after applying a horizontal inverse transform matrix to inverse quantized coefficients. The vertical inverse transform may have basis vectors that approximate a DCT.

Alternatively, the vertical inverse transform may have basis vectors that are orthogonal. The vertical inverse transform may be performed using only operations that include at least one of addition, subtraction and shift.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical signals; etc.

Overview

An inverse quantization and inverse transform technique for use with, for example, video coding is described. Although the following discussion will focus on implementation in decoders, those skilled in the art would recognize that the same techniques may be implemented in encoders. As discussed in more detail below, in one embodiment, the techniques employ a single array (e.g., a unified 1-D array V). In one embodiment, inverse quantization is performed by applying values of a 1-dimensional array to blocks of information (e.g., video information). The 1-dimensional array, for example, an array V, may have 32 entries:

V = {10, 11, 11, 12, 13, 13, 14, 15, 16, 17, 18, 19, 20, 21, 23, 24, 25, 27, 29, 30, 32, 34, 36, 38, 40, 43, 45, 48, 51, 54, 57, 60}. Other single arrays may be used. In the example above, the entries of the array V are of the form pow(2, (k+O)/12), where k represent the position of the entry in the array and O is a constant. For example, O may be 40.

The use of a single array is advantageous in that using only one array means that there is only one inverse quantization function that is used, resulting in a more efficient operation. The single inverse quantization function may be used regardless of the inverse transform that is to be applied. Thus, it is used to quantize coefficients prior to any of the transforms used in the decoding process. In one embodiment, the inverse quantization and inverse transform require fewer operations to compute the inverse transform because only addition, subtraction and shift operations are used, as opposed to multiplication operations.

Furthermore, in one embodiment, no intermediate scaling is required between the horizontal and vertical inverse transforms. A transform of size 8 may reuse components utilized by a transform of size 4, and a transform of size 8 provides a closer approximation of the discrete cosine transform (DCT). Furthermore, the inverse transform for at least 4×4, 4×8, 8×4 and 8×8 block sizes may be implemented using 16 bit registers, and registers greater than 16 bits in size are not required. Similar techniques may be utilized in performing transforms and quantization, as in an encoder, and as will be discussed below.

Inverse Quantization and Inverse Transformation

FIG. 3 is a flow diagram of one embodiment of a process for performing of inverse quantization in accordance with an embodiment of the invention. The process is performed by processing logic that may comprise hardware (circuitry, dedicated logic, etc.), software (such as is run on a general purpose computer system or a dedicated machine), or a combination of both. The inverse quantization described with respect to flow chart of FIG. 3 will be described with respect to the 1-dimensional array V; however, it will be apparent that 1-dimensional arrays having different element values, or a different number of elements, may be utilized.

The inverse quantization is performed on an array of quantized coefficients C that includes quantized coefficients $c\_ij$. Referring to FIG. 3, at processing block 305, processing logic receives a quantized coefficient $c\_ij$ of the array of quantized coefficients C, where the quantized coefficient $c\_ij$ is a coefficient having the position i,j in the quantized coefficient matrix C.

Processing logic determines an offset of the array V according to the position i,j of a coefficient in the quantized coefficient matrix $c\_ij$ (processing block 310). The offset represents a scaling value that depends on the norms of the basis vectors the coefficient relates to, and in one embodiment is determined as:

$$\text{offset}(i,j) = \text{ofst4}[i] + \text{ofst4}[j], \text{ for 4×4 blocks}$$

$$\text{offset}(i,j) = \text{ofst8}[i] + \text{ofst4}[j], \text{ for 8×4 blocks}$$

$$\text{offset}(i,j) = \text{ofst4}[i] + \text{ofst8}[j], \text{ for 4×8 blocks}$$

$$\text{offset}(i,j) = \text{ofst4}[i] + \text{ofst8}[j], \text{ for 8×8 blocks}$$

where $$\text{ofst4} = \{0, 4, 0, 4\}, \text{ and}$$

$$\text{ofst8} = \{6, 5, 10, 5, 6, 5, 10, 5\}.$$

Upon determining the offset for the particular position i,j of the coefficient in the quantized coefficient matrix, processing logic determines an inverse quantization value for the coefficient (processing block 315), as described below.

For a 4×4 transform, the inverse quantization may generate a matrix W of reconstructed coefficients, in C-language programming notation, as:

$$w\_ij = (c\_ij * V[2*(QP\%6) + \text{offset}(i,j)]) << (QP/6).$$

Note that in one embodiment the V[.] operation described in the equation above and other equations herein is implemented as a table look-up operation.

For a 4×8 or 8×4 transform, the reconstruction coefficients resulting from inverse quantization may be determined by:

$$w\_ij = (c\_ij * V[2*(QP\%6) + \text{offset}(i,j)]) << (QP/6-1) \text{ if } QP >= 6, \text{ and}$$

$$w\_ij = (c\_ij * V[2*(QP\%6) + \text{offset}(i,j) + 1]) >> 1 \text{ otherwise,}$$

where "w_ij" is a reconstructed coefficient of the matrix W, for example, similar to a coefficient w_ij discussed above. For an 8×8 transform, the reconstructed coefficients resulting from inverse quantization may be determined by:

$$w\_ij = (c\_ij * V[2*(QP\%6) + \text{offset}(i,j)]) << (QP/6-2) \text{ if } QP >= 12, \text{ and}$$

$$w\_ij = (c\_ij * V[2*(QP\%6) + \text{offset}(i,j) + (1 << (1-QP/6))]) >> (2-QP/6) \text{ otherwise,}$$

where w_ij is a coefficient of the matrix W.

In another embodiment, the array ofst4 and ofst8 may be defined as:

$$\text{ofst4} = \{4, 11, 4, 11\}$$

$$\text{ofst8} = \{1, 0, 5, 0, 1, 0, 5, 0\}$$

and a reconstructed coefficient w_ij is determined by:

$$w\_ij = (c\_ij * V[2*(QP\%6) + \text{offset}(i,j)] << (QP/6)$$

for blocks of size 4×4, 4×8, 8×4 an 8×8.

In yet another embodiment, the size of array V may be increased and the reconstruction formula defined as:

$$w\_ij = (c\_ij * V[QP + \text{offset}(i,j)]).$$

In a further embodiment, additional weighting factors may be included as a function of block size and coefficient position within a block, as:

$$w\_ij=(c\_ij*V[QP+\text{offset}(i,j)+f(\text{block size},i,j)]).$$

where f(block size,i,j) defines the weighting factors. Such weighting may be used to adapt to the perceptual importance of each coefficient. MPEG-2 (ISO/IEC 13818-2) provides such functionality by requiring additional multiplication and shift operations, whereas in the present information only additional add operations are required.

Upon determining the inverse quantized value w_ij for the particular position i,j of the coefficient in the quantized coefficient matrix, processing logic determines whether there are more coefficients of the quantized coefficient matrix C for which an inverse quantization is to be performed (processing block 320). If there is, processing transitions to processing block 305 where the next quantized coefficient c_ij of the quantized matrix C is received. However, if there are no more coefficients for which an inverse quantization is to be performed, inverse quantization for the quantized coefficient matrix ends (processing block 325).

Thus, inverse quantization of a quantized coefficient matrix may be determined utilizing a single 1-dimensional array of values, where the size block being inversely quantized is at least a 4×4, 4×8, 8×4 and 8×8 size block of information.

Although the inverse quantization process may determine both an offset value and an inverse quantization value for a coefficient of the quantized coefficient matrix before processing the next coefficient. However, it will be apparent to one skilled in the art that in an alternative embodiment, offset values for all coefficients of the quantized coefficient matrix may be determined first, and then the inverse quantization values may be determined for all coefficients of the quantized coefficient matrix, using the determined offset values.

In another embodiment, an inverse transformation may be performed without performing multiplication operations, as described below. In addition, or in the alternative, the inverse transformation may be carried out without performing an intermediate scaling operation.

After inverse quantization is applied, an inverse transform is applied. In this embodiment, the vector basis for the transform of size 4 may be unchanged (e.g., as shown in FIG. 2A). The inverse transform may be modified by changing the vector basis for the 8×8 transform. Further, the intermediate scaling process may be removed. In such a case, the array resulting from the horizontal transform is directly input to the vertical transform.

The vector basis for one embodiment of the inverse transform of size 8 is shown in the table of FIG. 4, which approximates a DCT, and has a substantially orthogonal basis (i.e. the product of any 2 vectors is zero or substantially close to zero). A flow chart describing inverse transformation is shown in FIG. 5.

Figures 5, 6:
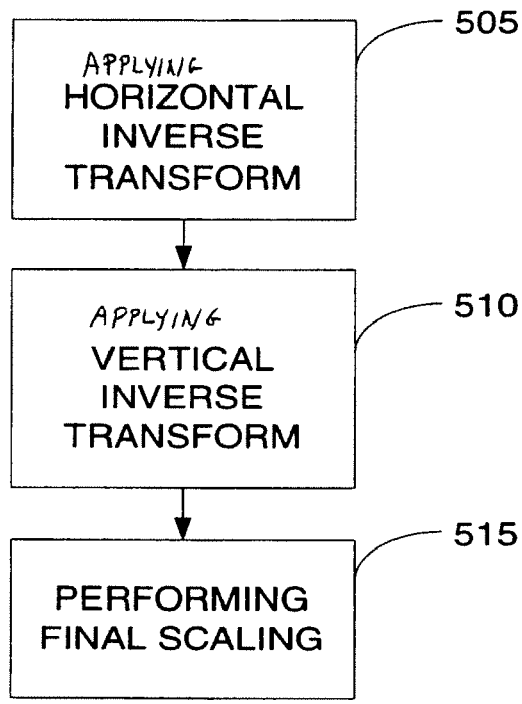
FIG. 5 is a flow diagram of one embodiment of a process for performing an inverse transform.
FIG. 6 illustrates one embodiment of an algorithm that may be utilized in determining an inverse transform.

FIG. 5 is a flow diagram of one embodiment of a process for performing an inverse transform. The process is performed by processing logic that may comprise hardware (circuitry, dedicated logic, etc.), software (such as is run on a general purpose computer system or a dedicated machine), or a combination of both.

Referring to FIG. 5, processing logic computes an array Z resulting from a horizontal inverse transform (processing block 505), where:

$$Z=W*\text{transpose}(M4), \text{ for } 4\times8 \text{ and } 4\times4 \text{ blocks, and}$$

$$Z=W*\text{transpose}(M8), \text{ for } 8\times8 \text{ and } 8\times4 \text{ blocks,}$$

and where M4 is, in one embodiment, shown in FIG. 1A and M8 is, in one embodiment, shown in FIG. 4. A determination of an array Z resulting from the inverse horizontal transform will be discussed in detail below, and as described further below, the inverse horizontal transform may be computed without utilizing multiplication operations.

Then, processing logic determines an array X' that results from applying a vertical transform to the array Z (processing block 510), as $$X'=M4*Z, \text{ for } 8\times4 \text{ and } 4\times4 \text{ blocks, and}$$

$$X'=M8*Z, \text{ for } 8\times8 \text{ and } 4\times8 \text{ blocks,}$$

where M4 is, in one embodiment, as shown in FIG. 2A, and M8 is, in one embodiment, as shown in FIG. 4. A determination of the array X' will be discussed in detail below, and as is discussed below, the array X' may also, or in the alternative, be obtained without utilizing multiplication operations.

After applying the horizontal and vertical inverse transforms, processing logic performs final scaling on the resulting array X' (processing block 515), as:

$$X\_ij=(X'\_ij+32)>>6.$$

The above expression is typically used when the bit depth of video samples is equal to 8. Where the bit depth of video samples is larger than 8, the scaling operation may take the more general form:

$$X\_ij=(X'\_ij+(1<<(13-D)))>>(14-D).$$

where D represents the bit depth of video samples.

FIG. 6 is one embodiment of an algorithm that may be utilized to calculate an inverse transform (i.e. Z of the inverse horizontal transform and X' of the inverse vertical transform) for at least 8×8, 8×4 and 4×8 blocks of information, without utilizing matrix multiplication. The "in" coefficients of the "in" vector of the algorithm of FIG. 6 are retrieved from an IN matrix (input matrix), and the "out" coefficients of the "out" vector of the algorithm of FIG. 6 are used to form an OUT matrix (output matrix). The "in" vector of the IN matrix that is operated on, and the "out" vector of the OUT matrix that is formed, is determined as follows. For a horizontal transform, the "in" vector is a row of the array W, and the "out" vector is the corresponding row of the array Z. For a vertical transform, the "in" vector is a column of the array Z, and the "out" vector is the corresponding column of the array X' by the particular part of the inverse transform being performed, as is discussed below with respect to the flow diagrams of FIGS. 7-9.

Figure 7:
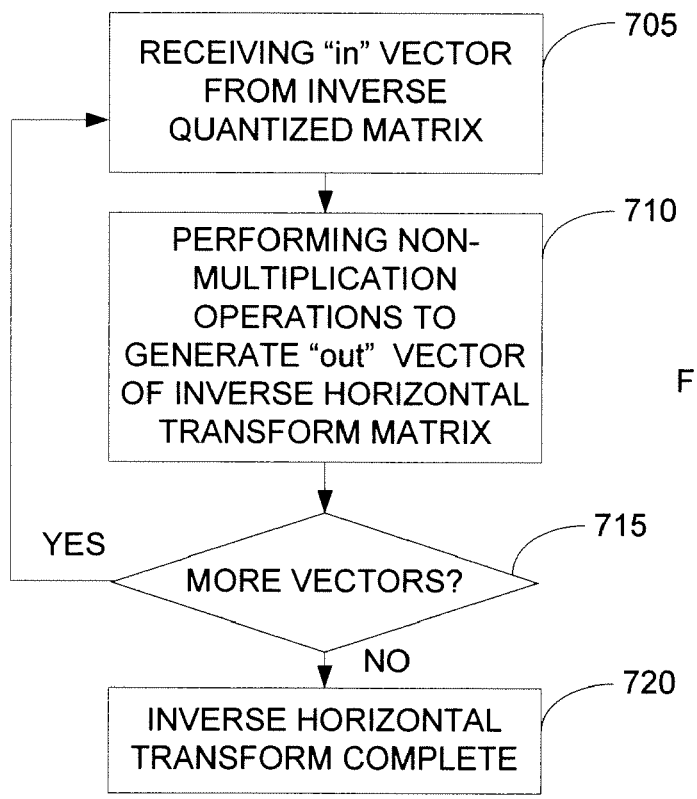
FIG. 7 is a flow diagram of one embodiment of a process for determining an inverse horizontal transform utilizing the algorithm of FIG. 6.

FIG. 7 is a flow diagram of one embodiment of a process for calculating an inverse horizontal transform utilizing the algorithm of FIG. 6. The process is performed by processing logic that may comprise hardware (circuitry, dedicated logic, etc.), software (such as is run on a general purpose computer system or a dedicated machine), or a combination of both.

Referring to FIG. 7, processing logic retrieves an "in" vector from the IN matrix (processing block 705). As the inverse transform being performed is the inverse horizontal transform, the vector may be a row of the matrix W resulting from the inverse quantization (thus the matrix W is the IN matrix used). Upon receiving the "in" vector of the quantized coefficient matrix W, processing logic performs a sequence of addition, subtraction and shift operations (non-multiplication operations) to generate the "out" vector coefficients, here, a row of the array Z (processing block 710). The operations may be accomplished, for example, as shown by the algorithm of FIG. 6. Using the algorithm of FIG. 6, the "in" vector is a row of the inverse quantized matrix W, and the generated "out" vector is an output vector (row) of the Z matrix.

After generating the "out" vector of the matrix Z, processing logic determines whether there are any more vectors of the inverse quantized IN matrix on which to operate (processing block 715). Where there are more vectors of the inverse quantized matrix, processing transitions to processing block 705. However, if all vectors of the inverse quantized matrix have been transformed, application of the inverse horizontal transform ends (processing block 720). One skilled will realize that when using a processor with multimedia extensions such as Pentium IV processor of Intel Corporation of Santa Clara, Calif., several vectors may be processed in parallel.

Thus, an inverse horizontal transform may be accomplished, for example for at least inverse quantized matrices of size 8×8 and 4×8 blocks, without multiplication operations, but rather utilizing, for example, addition, subtraction and shifting operations.

Upon determination of the matrix Z from the inverse quantized coefficient matrix, W, an inverse vertical transformation may be carried out without the need for intermediate scaling. For example, the inverse vertical transform may be performed on a matrix Z resulting from the horizontal transform described above. An inverse vertical transform may then be carried out as shown with respect to the flow diagram of FIG. 8.

Figure 8:
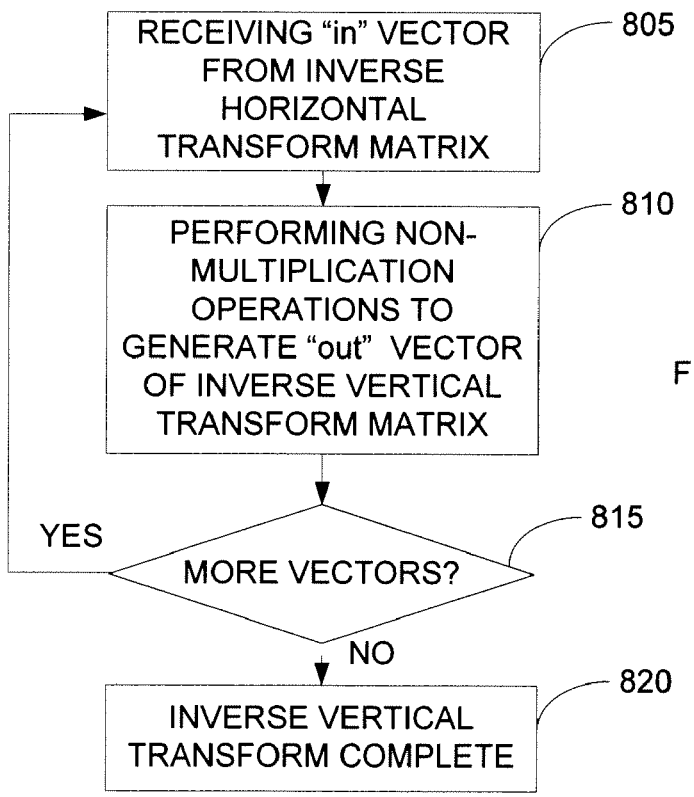
FIG. 8 is a flow diagram of one embodiment of a process for determining an inverse vertical transform utilizing the algorithm of FIG. 6.

FIG. 8 is a flow diagram of one embodiment of a process for performing an inverse vertical transform utilizing the algorithm of FIG. 6. The process is performed by processing logic that may comprise hardware (circuitry, dedicated logic, etc.), software (such as is run on a general purpose computer system or a dedicated machine), or a combination of both.

Referring to FIG. 8, processing logic receives an "in" vector is received from the IN matrix (processing block 805). As the inverse transform being performed is the inverse vertical transform (i.e. processing block 510 of FIG. 5), the vector may be a column of the matrix Z.

After receiving the "in" vector, processing logic performs non-multiplication operations to generate the "out" vector coefficients (and thus a column of the matrix X') (processing block 810). The non-multiplication operations may be accomplished, for example, as shown by the algorithm of FIG. 6. Using the algorithm of FIG. 6, the "in" is the retrieved vector (column) from the matrix Z' (as received in processing block 805). The "out" is an output vector (column) of a column of the matrix X'.

After generating the "out" vector, processing logic determines whether there are any more vectors of the matrix Z on which to operate (processing block 815). Where there are more vectors of the matrix Z, processing transitions to processing block 805 as discussed above. However, if all vectors of the matrix Z have been transformed, then processing logic stops applying the inverse vertical transform (processing block 820). Similar to as discussed above with respect to the inverse horizontal transform, one skilled will realize that when using a processor with multimedia extensions such as Pentium 4 processor, several vectors may be processed in parallel.

Thus, the algorithm of FIG. 6 may be utilized to compute the inverse horizontal transform and the inverse vertical transform without requiring any matrix multiplication. Thus, the inverse transform may be more efficiently and rapidly computed. Further, no intermediate scaling is required between the horizontal and vertical inverse transforms, and for a transform of size 8 (as well as for other transform sizes).

In another embodiment, a combination of transforms with quantization may be used for the design of a single transform.

FIG. 9 is a table illustrating a basis vector that may be utilized in the design of one embodiment of a single 4×4 transform. In the basis vector shown in FIG. 9, the norm of the first and third basis vectors is 2, and the norm of the second and fourth basis vectors is substantially equal to the square root of 3.625 (sqrt(3.625)=1.903943 . . . ). The ratio between the norms is 1.050451 . . . which is very close to pow(2, 1/14)=1.050756 . . . .

Therefore a single scaling table may be used for inverse quantization, the scaling table having the form, in C-programming computer language notation, of:

$$c*pow(2,k/14),$$

where c is a constant, and k=0 . . . 15 and represents an offset. In one embodiment, the values in the table are integer numbers that may be derived by rounding the result of the expression above to a nearest integer.

For example where c=32, the scaling table may include the values:

$$V[\ ]\ 32, 34, 35, 37, 39, 41, 43, 45, 48, 50, 53, 55, 58, 61, 64, 67.$$

Scaling may then be performed, using an offset value, as:

$$w\_ij=c\_ij*V[(QP\%14)+\text{offs}[i]+\text{offs}[j]]<<(QP/14),$$

where the offset value is determined by:

$$\text{offs}[\ ]=0, 1, 0, 1$$

In another embodiment, a larger array V may be used and the scaling operation modified as:

$$w\_ij=c\_ij*V[QP+\text{offs}[i]+\text{offs}[j]].$$

In such a case, the size of the array V is determined by the maximum value of QP plus 2.

In yet another embodiment, the values in the array V may take the form:

$$c*pow(2/sqrt(3.625),k).$$

In a further embodiment, the scaling may be computed as:

$$w\_ij=(c\_ij<<(QP/14))*V[(QP\%14)+\text{offs}[i]+\text{offs}[j]]>>16$$

where the combination of multiplication and shift right by 16 positions may be implement in a single instruction on processors that support it. For example, in the MMX instruction set a multiplication may take two 16-bit values as argument and return the most significant bits of the 32-bit result without sacrificing the amount of parallelism.

The values of transform vectors may all be expressed as a power of two or the sum of two powers of two, and the implementation of a 1-D inverse transform is simple. For example, where x[ ] is the input and y[ ] is the output, an inverse transform applying to the input vector may be implemented, in one embodiment, as shown by the algorithm of FIG. 10. In an alternative embodiment, rounding factors before a shift right operation may be modified. For example, an operation x>>1 may be replaced by (x+1)>>1, and an operation (x+2)>>2 may be replaced by x>>2 or (x+1)>>2.

Using the basis vectors and algorithm of FIGS. 9 and 10 respectively allows the use of a simple algorithm with high precision.

The techniques described herein may be applicable to both the encoding process and the decoding process, as would be appreciated by one skilled in the art. The offsets and the scaling vectors an encoding embodiment may be recomputed accordingly, with similar considerations as in the decoding process discussed above.

Encoding

Figures 11, 12:
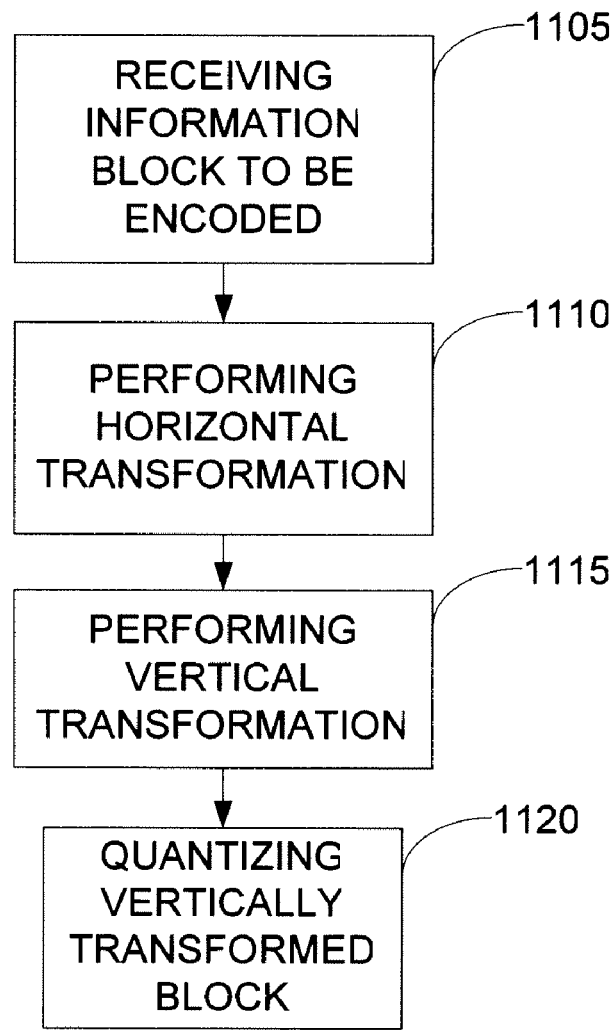
FIG. 11 is a flow diagram of one embodiment of a process for performing a unified transform in an encoder.
FIG. 12 is a table illustrating a basis vector of size 4 for one embodiment of a matrix M4.

FIG. 11 is a flow diagram of one embodiment of a process for performing a unified transform for encoding. The process is performed by processing logic that may comprise hardware (circuitry, dedicated logic, etc.), software (such as is run on a general purpose computer system or a dedicated machine), or a combination of both.

In performing the transform for encoding, X is an input block to be transformed, Z is a transformed block (a matrix Y representing a horizontally transformed block and the matrix Z representing a further vertically transformed matrix) and Z' is a quantized transformed block. Referring to FIG. 11, processing logic receives a block of information to be encoded (processing block 1105). Then processing logic performs a horizontal transform (processing block 1110), in C-language computer notation, as:

$$Y = X * M4 \text{ for } 4 \times 8 \text{ and } 4 \times 4 \text{ blocks, and}$$

$$Y = X * M8 \text{ for } 8 \times 8 \text{ and } 8 \times 4 \text{ blocks,}$$

where M4 is a basis vector for a transform of size 4, in one embodiment, as shown in the table of FIG. 12, and M8 is a basis vector for a transform of size 8, in one embodiment, the M8 basis vector as used for inverse transforms of size 8, and as shown in FIG. 4.

Once the horizontal transform is performed, processing logic performs a vertical transform (processing block 1115). The vertical transform to determine a vertically transformed matrix Z may be performed as:

$$Z = \text{transpose}(M4) * Y \text{ for } 8 \times 4 \text{ and } 4 \times 4 \text{ blocks, and}$$

$$Z = \text{transpose}(M8) * Y \text{ for } 8 \times 8 \text{ and } 4 \times 8 \text{ blocks,}$$

where M4 and M8 maybe as discussed above with respect to the horizontal transform of processing block 1110.

Upon performing the vertical transform at box 1115, quantization may be performed at processing block 1120. In one embodiment, the quantization may be performed using a 1-D, 32 element array V':

$$V' = \{26008, 24548, 23170, 21870, 20643, 19484, \\ 18390, 17358, 16384, 15464, 14596, 13777, \\ 13004, 12274, 11585, 10935, 10321, 9742, 9195, \\ 8679, 8192, 7732, 7298, 6889, 6502, 6137, 5793, \\ 5468, 5161, 4871, 4598, 4340\}$$

where each element k of the array V' may be equal to $16384 * \text{pow}(0.5, (k-8)/12.0)$.

To perform the quantization, an offset for each coefficient of the transformed matrix Z may be computed as:

$$\text{offset}(i,j) = \text{ofst4}[i] + \text{ofst4}[j] \text{ for } 4 \times 4 \text{ blocks}$$

$$\text{offset}(i,j) = \text{ofst4}[i] + \text{ofst8}[j] \text{ for } 4 \times 8 \text{ blocks}$$

$$\text{offset}(i,j) = \text{ofst8}[i] + \text{ofst4}[j] \text{ for } 8 \times 4 \text{ blocks, and}$$

$$\text{offset}(i,j) = \text{ofst8}[i] + \text{ofst8}[j] \text{ for } 8 \times 8 \text{ blocks, where}$$

$$\text{ofst4} = \{0, 8, 0, 8\}, \text{ and}$$

$$\text{ofst8} = \{6, 7, 2, 7, 6, 7, 2, 7\}.$$

The quantized transformed block Z may be computed as:

$$Z\_ijz'\_ij = \text{sign}(z\_ij) * \text{abs}\{(z\_ij * V[2*(QP\%6) + \text{offset} \\ (i,j)] + (1 << (16 + (QP/6)))/B) >> (16 + (QP/6))\}$$

where B can be any number equal or larger than 2 and represents a bias that can be used to trade off between the cost of coding the coefficient and the reconstruction error.

The 1-dimensional matrix V and V' used in carrying-out the unified inverse quantization and unified quantization and the vector basis of FIG. 4 for accomplishing inverse transform in a decoder, the basis vector of FIG. 9 for accomplishing the combining of simple transforms with quantization for the design of a single transform in a decoder, and basis vectors of FIGS. 12 and 4 for carrying out the transform in an encoder, are merely exemplary, and other arrays and/or vector basis may be determined to achieve at least some of the advantages discussed herein. For example, the 1-dimensional matrix allows for unified inverse quantization by setting its entries to fractional powers of two (in the present example the i-th entry of the matrix has value of floor(pow(2,4+(i−8)/12.0)+0.5)) and thus, any 1-dimensional array designed with these considerations may be utilized. In some circumstances, the offset vectors for calculating the offsets discussed above may be altered to allow use of the uniform quantization by taking into consideration the norms of the basis vectors of the transforms. For example, and in the present case of the matrix shown in FIG. 4, the first basis vector has norm sqrt(8)=pow(2,18/12.0), the second vector has norm sqrt(578/64) which is about pow(2,19/12.0), and the third vector has norm sqrt(5) which is about pow(2,14/12.0). Note that {6,5,10, . . . } is obtained by {24−18, 24−19, 24−10, . . . }.

Similarly, the vector basis of FIG. 4 discussed above allows for the algorithm of FIG. 6 to be utilized without the need for multiplication operations, and intermediate scaling, because the largest coefficient of each vector is equal to or close to 1, coefficients can be represented as the sum of at most two powers of 2, and thus any vector basis designed/determined with these considerations may be utilized while achieving at least some of the advantages discussed herein.

Thus, considerations regarding the basis vector coefficients being a sum of two integer (positive or negative) powers of two, and the vector coefficients typically not exceeding two may provide one or more of the advantages discussed above.

Further, a vector basis may be similarly determined/designed for transforms of other sizes (i.e. greater than 8) under the considerations discussed above, and the invention is thus not limited to transforms of size 4×4, 4×8, 8×4 or 8×8. For instance, a transform of size 16×16 could be designed such that the norm of the basis vectors can be closely approximated by pow(2,k/n) where k and n are small numbers (in the present case for the 8×8 transform n is 12).

An Exemplary Decoder

Figure 13A:
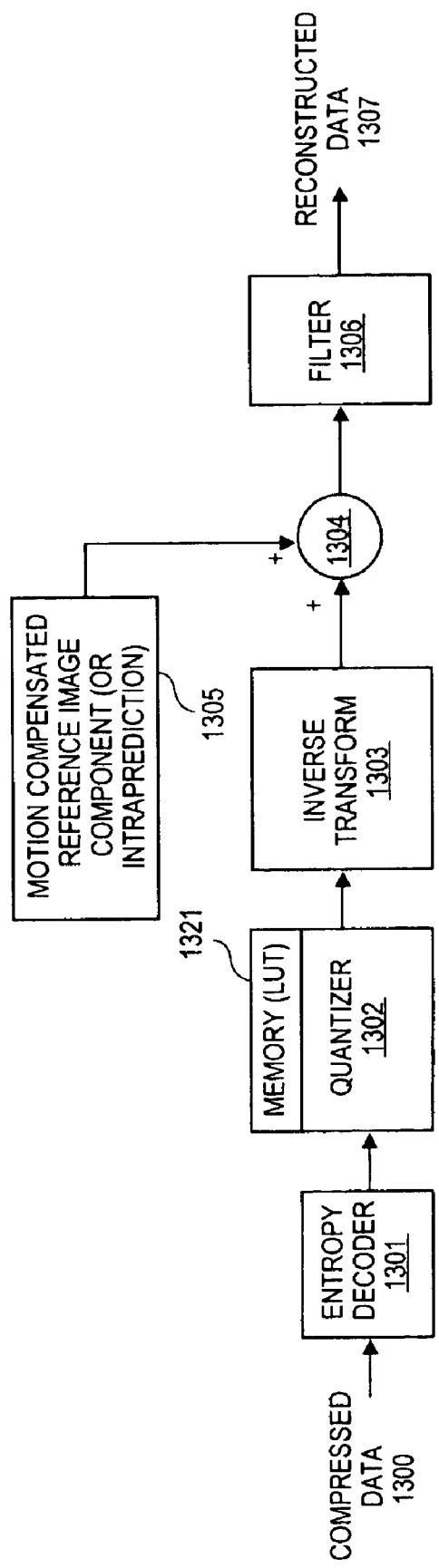
FIG. 13A is a block diagram of one embodiment of a decoder.

FIG. 13A is a block diagram of one embodiment of a decoder. Referring to FIG. 13A, compressed data 1300 is entropy decoded by entropy decoder 1301. The entropy encoded data comprises coefficients. In one embodiment, entropy decoder 1301 performs variable length decoding or context adaptive binary arithmetic decoding.

The entropy decoded data output by entropy decoder 1301 undergoes inverse quantization using inverse quantizer 1302. Inverse quantizer 1302 includes, or has access to, a memory 1321 that stores a look-up table to perform the inverse quantization as described above. Note that the entropy decoded data may be arranged to de-serialize the coefficients into arrays prior to undergoing inverse quantization. Alternatively, de-serialization may occur after inverse quantization.

After inverse quantization, an inverse transform 1303 is applied to the inverse quantized coefficients. In one embodiment, inverse transform 1303 comprises horizontal and vertical 1-D transforms as described above. The decoded data that is produced from applying inverse transform 1303 is combined with either a motion compensated block or a spatially predicted block produced in component 1305 using adder 1304.

The output of adder 1304 may be filtered using filter 1306 to remove artifacts caused by application of the transforms and quantization as well as motion vector differences between adjacent blocks. The output of filter 1306 is reconstructed data 1307. In one embodiment, filter 1306 is an in-loop filter (i.e., the filtered image is used for future motion compensated prediction). The in-loop filter may operate on both 16×16 macroblocks and block boundaries, where blocks may have a size equal to 4×4, 4×8, 8×4 or 8×8.

Figure 13B:
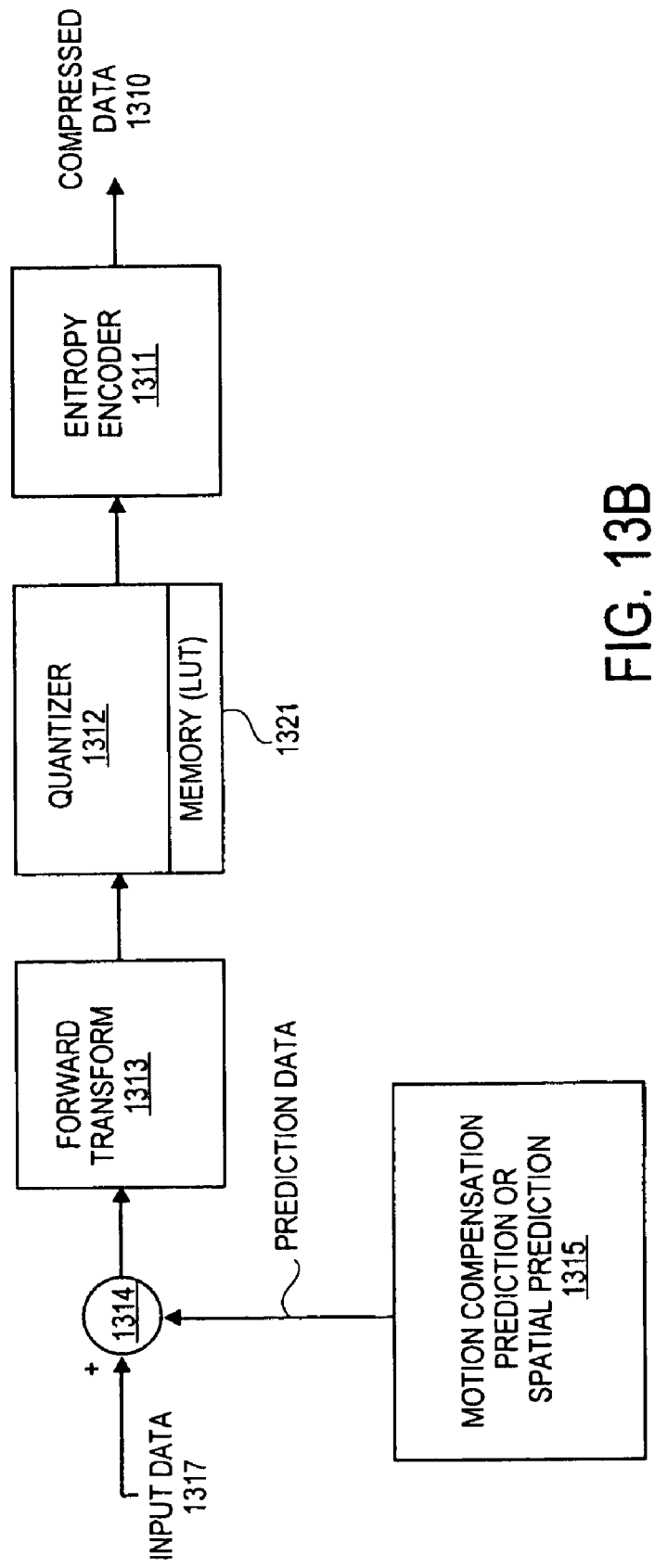
FIG. 13B is a block diagram of one embodiment of an encoder.

FIG. 13B is a block diagram of one embodiment of an encoder. Referring to FIG. 13B, input data 1317 is received by subtractor 1314. Input data 1317 may comprise an input frame. Subtractor 1314 subtracts prediction data generated by motion compensation or spatial prediction unit 1315 from input data 1317. In one embodiment, the prediction data comprises a motion compensated block or a spatially predicted block.

The results of the subtraction are input to forward transform 1313, which block transforms the data to produce coefficients. In one embodiment, forward transform 1313 comprises horizontal and vertical 1-D transforms that are inverse to the inverse transforms described above.

The coefficients are then quantized by quantizer 1312 to produce quantized transform coefficients. Quantizer 1312 includes, or has access to, a memory 1321 that stores a look-up table to perform the quantization operation in a manner inverse to the inverse quantization described above. The quantized transform coefficients may be re-ordered from arrays to serialize the quantized transform coefficients. After any re-ordering, the quantized transform coefficients are then entropy encoded by entropy encoder 1311. In one embodiment, entropy encoder 1311 performs variable length encoding or context adaptive binary arithmetic encoding.

As discussed above, the considerations for performing the transform in an encoder are similar to those for performing the inverse transform in the decoder. Although the discussion has been in the context of providing transforms for video coding, one skilled would realize that such transforms may have applicability to areas of technology separate from the quantization and transforms for processing video, and thus the teachings herein are not limited to video coding.

When carrying out the unified inverse quantization and inverse transform described herein, it would be apparent to one skilled in the art that the application of the quantization and inverse transform may be accomplished through software running on a suitable processor and having suitable memory for performing the required operations. Processors capable of using multi-media extensions within their processing sets may be advantageous but are not required. One skilled would realize that the quantization and transform techniques taught herein may alternatively be accomplished with any combination of software and hardware devices, or completely in hardware where desired and as would be appreciated by one skilled in the art.

An Exemplary Computer System

Figure 14:
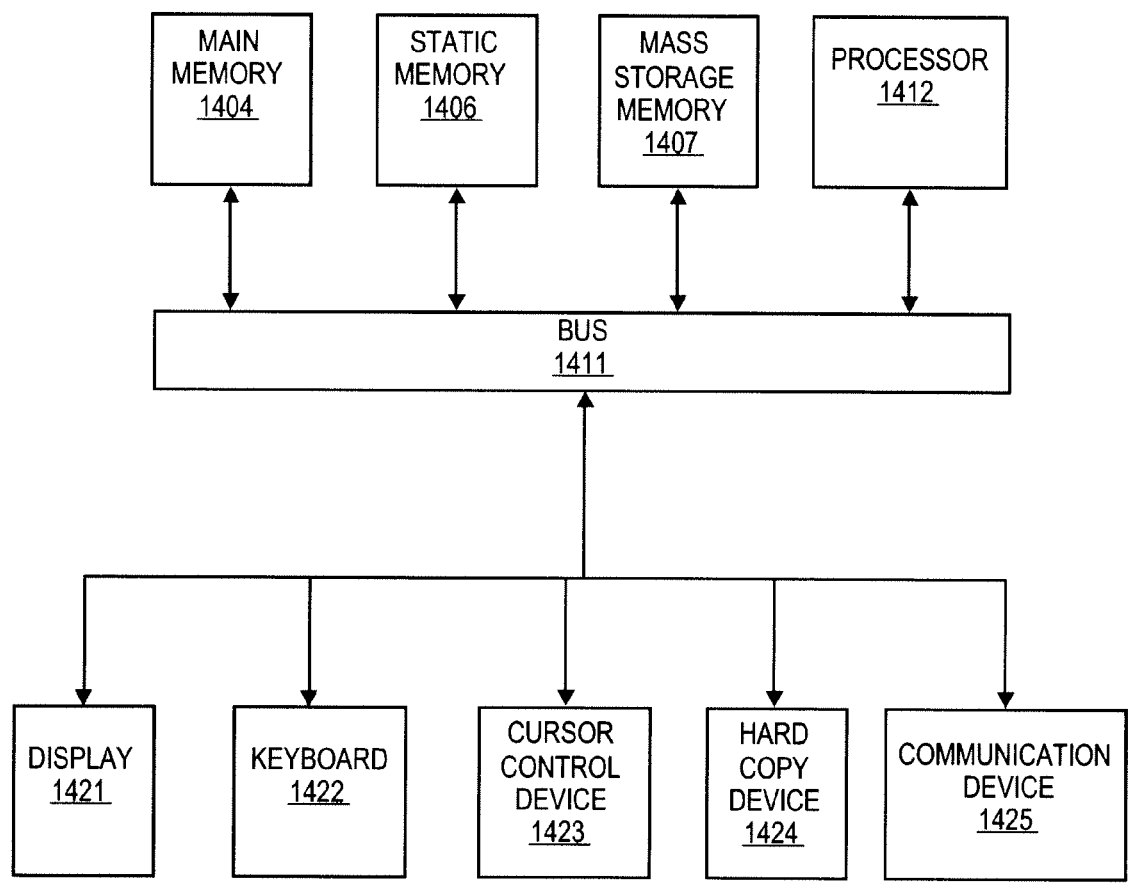
FIG. 14 is a block diagram of an exemplary computer system.

FIG. 14 is a block diagram of an exemplary computer system that may perform one or more of the operations described herein. Note that these blocks or a subset of these blocks may be integrated into a device such as, for example, a cell phone, to perform the techniques described herein.

Referring to FIG. 14, computer system 1400 comprises a communication mechanism or bus 1411 for communicating information, and a processor 1412 coupled with bus 1411 for processing information. Processor 1412 includes a microprocessor, but is not limited to a microprocessor, such as, for example, Pentium™, PowerPC™, Alpha™, etc.

System 1400 further comprises a random access memory (RAM), or other dynamic storage device 1404 (referred to as main memory) coupled to bus 1411 for storing information and instructions to be executed by processor 1412. Main memory 1404 also may be used for storing temporary variables or other intermediate information during execution of instructions by processor 1412.

Computer system 1400 also comprises a read only memory (ROM) and/or other static storage device 1406 coupled to bus 1411 for storing static information and instructions for processor 1412, and a data storage device 1407, such as a magnetic disk or optical disk and its corresponding disk drive. Data storage device 1407 is coupled to bus 1411 for storing information and instructions.

Computer system 1400 may further be coupled to a display device 1421, such as a cathode ray tube (CRT) or liquid crystal display (LCD), coupled to bus 1411 for displaying information to a computer user. An alphanumeric input device 1422, including alphanumeric and other keys, may also be coupled to bus 1411 for communicating information and command selections to processor 1412. An additional user input device is cursor control 1423, such as a mouse, trackball, trackpad, stylus, or cursor direction keys, coupled to bus 1411 for communicating direction information and command selections to processor 1412, and for controlling cursor movement on display 1421.

Another device that may be coupled to bus 1411 is hard copy device 1424, which may be used for printing instructions, data, or other information on a medium such as paper, film, or similar types of media. Furthermore, a sound recording and playback device, such as a speaker and/or microphone may optionally be coupled to bus 1411 for audio interfacing with computer system 1400. Another device that may be coupled to bus 1411 is a wired/wireless communication capability 1425 for communication to a phone, handheld palm device, other device.

Note that any or all of the components of system 1400 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A decoding method including:

computer implemented steps performed by a processor of a computer system to implement the following steps:

receiving a block of coefficients relating to a block of video information to be displayed which has been transformed and quantized for compression of the video information:

providing a single, one dimensional look-up table (LUT) which consists of a single group of scaling factors applicable for scaling of coefficients of different block sizes;

computing an index for each coefficient, the index being a function of a quantization parameter, a size of the block of coefficients, and a position of said each coefficient within the block;

indexing the LUT, using the computed index, to determine a scaling factor in the LUT applicable for scaling of said each coefficient;

scaling the block of received coefficients, using the determined scaling factors, to inversely quantize the block of received coefficients; and applying a vertical transform and a horizontal transform to the block of scaled coefficients in order to reconstruct a signal of the block video information for display of the video signal, where basis vectors of the vertical and horizontal transform are

| 1 | 1 | 1 | 1 |
|---|---|---|---|
| $5/4$ | $1/2$ | $-1/2$ | $-5/4$ |
| 1 | $-1$ | 1 | $-1$ |
| $1/2$ | $-5/4$ | $5/4$ | $-1/2$ | or transpose thereof.

2. The decoding process defined in claim 1, wherein the index is a sum of a modulo from the quantization parameter, a first value determined by a vertical position of said each coefficient within the block and a second value determined by a horizontal position of said each coefficient within the block.

3. The decoding process defined in claim 1 wherein applying the transform comprises computing the transform using a sequence of only addition, subtraction and shift operations.

4. A decoder for decoding a block of coefficients relating to a block of video information to be displayed which has been transformed and quantized for compression of the video information, the decoder comprising:

a memory which stores a single, one dimensional look-up table (LUT) which consists of a single group of scaling factors applicable for scaling of coefficients of different block sizes;

an index calculator configured to compute an index for each coefficient, the index being a function of a quantization parameter, a size of the block of coefficients, and a position of said each coefficient within the block;

an indexer configured to index the LUT, using the computed index, to determine a scaling factor in the LUT applicable for scaling of said each coefficient;

a scaler configured to scale the block of received coefficients, using the determined scaling factor, to inversely quantize the block of received coefficients; and an inverse transformer configured to apply a vertical transform and a horizontal transform to the block of scaled coefficients in order to reconstruct a signal of the block video information for display of the video signal, wherein basis vectors of the vertical and horizontal transforms are

| 1 | 1 | 1 | 1 |
|---|---|---|---|
| $5/4$ | $1/2$ | $-1/2$ | $-5/4$ |
| 1 | $-1$ | 1 | $-1$ |
| $1/2$ | $-5/4$ | $5/4$ | $-1/2$ | or transpose thereof.

5. The decoder defined in claim 4, wherein the index is a sum of a modulo from the quantization parameter, a first value determined by a vertical position of said each coefficient within the block and a second value determined by a horizontal position of said each coefficient within the block.

6. The decoder defined in claim 4 wherein applying the transform comprises computing the transform using only a sequence of addition, subtraction and shift operations.

7. A computer-readable medium, wherein the computer-readable medium is hardware, storing instructions which, when executed by a system, cause the system to:

receive a block of coefficients relating to a block of video information to be displayed which has been transformed and quantized for compression of the video information;

provide a single, one dimensional look-up table (LUT) which consists of a single group of scaling factors applicable for scaling of coefficients of different block sizes;

compute an index for each coefficient, the index being a function of a quantization parameter, a size of the block of coefficients, and a position of said each coefficient within the block;

index the LUT, using the computed index, to determine a scaling factor in the LUT applicable for scaling of said each coefficient;

scale the block of received coefficients, using the determined scaling factor, to inversely quantize the block of received coefficients; and apply a vertical transform and a horizontal transform to the block of scaled coefficients in order to reconstruct a signal of the block video information for display of the video signal, wherein basis vectors of the vertical and horizontal transforms are

| 1 | 1 | 1 | 1 |
|---|---|---|---|
| $5/4$ | $1/2$ | $-1/2$ | $-5/4$ |
| 1 | $-1$ | 1 | $-1$ |
| $1/2$ | $-5/4$ | $5/4$ | $-1/2$ | or transpose thereof.

8. The computer-readable medium defined in claim 7, wherein the index is a sum of a modulo from the quantization parameter, a first value determined by a vertical position of said each coefficient within the block and a second value determined by a horizontal position of said each coefficient within the block.

9. The computer-readable medium defined in claim 7, wherein instructions to cause the system to apply the transform comprise instructions which, when executed by the system, cause the system to compute the transform using only a sequence of addition, subtraction and shift operations.

10. A decoder for decoding a block of coefficients relating to a block of video information to be displayed which has been transformed and quantized for compression of the video information, the decoder comprising:

means for storing a single, one dimensional look-up table (LUT) which consists of a single group of scaling factors applicable for scaling of coefficients of different block sizes;

means for computing an index for each coefficient, the index being a function of a quantization parameter, a size of the block of coefficients, and a position of said each coefficient within the block;

means for indexing the LUT, using the computed index, to determined a scaling factor in the LUT applicable for scaling of said each coefficient, wherein indexing is independent of the block size;

means for scaling the block of received coefficients, using the determined scaling factor in the LUT applicable for scaling of said each coefficient; and means for applying a vertical transform and a horizontal transform to the block of scaled coefficients in order to reconstruct a signal of the block video information for display of the video signal, wherein basis vectors of the vertical and horizontal transforms are

| | | | |
|---|---|---|---|
| 1 | 1 | 1 | 1 |
| 5/4 | 1/2 | −1/2 | −5/4 |
| 1 | −1 | 1 | −1 |
| 1/2 | −5/4 | 5/4 | −1/2 | or transpose thereof.

11. The decoding process defined in claim 1, wherein the size of the block of received coefficient is one of 4×4 and 4×8.

12. The decoder defined in claim 4, wherein the size of the block of received coefficient is one of 4×4 and 4×8.

13. The article of manufacture defined in claim 7, wherein the size of the block of received coefficient is one of 4×4 and 4×8.

14. The decoding process defined in claim 10, wherein the size of the block of received coefficient is one of 4×4 and 4×8.

* * * * *

UNITED STATES PATENT AND TRADEMARK OFFICE
CERTIFICATE OF CORRECTION

PATENT NO.       : 7,627,187 B2                                        Page 1 of 1
APPLICATION NO.  : 12/032433
DATED            : December 1, 2009
INVENTOR(S)      : Frank Jan Bossen It is certified that error appears in the above-identified patent and that said Letters Patent is hereby corrected as shown below:

In the Claims

In column 17, claim 1, after line 26, replace the entire table with the following table.

| 1   | 1    | 1    | 1    |
|-----|------|------|------|
| 5/4 | 1/2  | -1/2 | -5/4 |
| 1   | -1   | -1   | 1    |
| 1/2 | -5/4 | 5/4  | -1/2 |

--                              --.

In column 18, claim 4, before line 9, replace the entire table with the following table.

| 1   | 1    | 1    | 1    |
|-----|------|------|------|
| 5/4 | 1/2  | -1/2 | -5/4 |
| 1   | -1   | -1   | 1    |
| 1/2 | -5/4 | 5/4  | -1/2 |

--                              --.

In column 18, claim 7, after line 45, replace the entire table with the following table.

| 1   | 1    | 1    | 1    |
|-----|------|------|------|
| 5/4 | 1/2  | -1/2 | -5/4 |
| 1   | -1   | -1   | 1    |
| 1/2 | -5/4 | 5/4  | -1/2 |

--                              --.

In column 20, claim 10, before line 8, replace the entire table with the following table.

| 1   | 1    | 1    | 1    |
|-----|------|------|------|
| 5/4 | 1/2  | -1/2 | -5/4 |
| 1   | -1   | -1   | 1    |
| 1/2 | -5/4 | 5/4  | -1/2 |

--                              --.

Signed and Sealed this

Second Day of November, 2010

David J. Kappos
*Director of the United States Patent and Trademark Office*